United States Patent [19]

Yagura et al.

[11] Patent Number: 5,001,657

[45] Date of Patent: Mar. 19, 1991

[54] RADIATION THERMOMETER

[75] Inventors: Hirokazu Yagura, Sakai; Kenji Imura, Osaka, all of Japan

[73] Assignee: Minolta Camera Kabushiki Kaisha, Osaka, Japan

[21] Appl. No.: 449,357

[22] Filed: Dec. 6, 1989

Related U.S. Application Data

[63] Continuation of Ser. No. 65,606, Jun. 22, 1987, abandoned.

[30] Foreign Application Priority Data

Jun. 24, 1986 [JP] Japan ................... 147753
Jun. 24, 1986 [JP] Japan ................... 147754

[51] Int. Cl.$^5$ .................. G01J 5/10; G06F 15/20
[52] U.S. Cl. ................. 364/557; 364/571.01; 374/2; 374/121
[58] Field of Search ............ 364/525, 571.01, 557; 356/43; 128/736; 250/252.2; 374/1, 2, 9, 121, 124, 128, 130, 131, 132, 133, 126, 142; 73/5

[56] References Cited

U.S. PATENT DOCUMENTS

| | | | |
|---|---|---|---|
| 3,777,568 | 12/1973 | Riggin et al. | 364/557 |
| 3,793,630 | 2/1974 | Meijer | 364/557 |
| 3,922,550 | 11/1975 | Crowley et al. | 374/127 |
| 4,172,383 | 10/1979 | Iuchi | 374/9 |
| 4,427,306 | 1/1984 | Adamson | 374/128 |
| 4,634,294 | 1/1987 | Christol et al. | 364/525 |
| 4,741,626 | 5/1988 | Hashimoto | 374/128 |

FOREIGN PATENT DOCUMENTS

| | | | |
|---|---|---|---|
| 7760 | 6/1974 | Japan . | |
| 91877 | 10/1978 | Japan . | |
| 70489 | 9/1979 | Japan . | |
| 74429 | of 1980 | Japan . | |
| 24676 | 7/1980 | Japan . | |
| 0014125 | 2/1981 | Japan | 374/128 |
| 0014126 | 2/1981 | Japan | 374/128 |
| 0087828 | 6/1981 | Japan | 374/128 |
| 0104226 | 8/1981 | Japan | 374/128 |
| 129226 | 1/1983 | Japan . | |
| 144436 | of 1984 | Japan . | |
| WO86/06163 | 10/1986 | PCT Int'l Appl. | 364/557 |

Primary Examiner—Parshotam S. Lall
Assistant Examiner—Ellis B. Ramirez
Attorney, Agent, or Firm—Franklin D. Ubell; Price, Gess & Ubell

[57] ABSTRACT

A radiation thermometer has a detector for receiving radiation energy from a target object, and the detector generates an AC signal as a result of movement of a chopper. The AC signal is rectified by a rectifying circuit and the rectified signal is supplied to a microcomputer. On the other hand, temperatures around the detector are detected by a temperature sensor and the temperature of the target object is measured based on those detected values. In addition, the radiation thermometer has various calibration modes other than a measurement mode. In a calibration mode I, calibration data concerning a difference in characteristics of the temperature sensor for each thermometer is obtained. Data for correcting timing for synchronous rectification by the rectifying circuit is obtained in a calibration mode II. Calibration data for calculation of the temperature of the target object is obtained in a calibration mode III. Those calibration data are temporarily stored in a non-volatile RAM so that the temperature of the target object can be calculated by using those calibration data when the measurement mode is selected.

35 Claims, 8 Drawing Sheets

RADIATION THERMOMETER

This is a continuation of application Ser. No. 065,606 filed on June 22, 1987 now abandoned.

BACKGROUND OF THE INVENTION

1. Field of the Invention

The present invention relates to a radiation thermometer and particularly to an improvement of calibration means and the like in a radiation thermometer for measuring temperature of a target object based on radiation energy emitted from the target object.

2. Description of the Prior Art

Various radiation thermometers for calculating the temperature of a target object based on radiation energy are known in the prior art. In order to reduce the manufacturing cost in such a radiation thermometer, it is necessary to consider a reduction in cost required for calibration as well as, or much more than a reduction in the costs of parts or an assembling cost. More specifically, in the case of such radiation thermometers, characteristics of components such as a detector for receiving radiation from a target object vary or show some irregular difference for each of the thermometers concerned and therefore calibration is indispensable for each thermometer.

Thus, in the prior art, various components such as a variable resistor for calibration are adjusted at the time of manufacturing a radiation thermometer. However, such adjustment work is extremely complicated.

Particularly, in a radiation thermometer using a pyroelectric device as a detector of radiation energy, a chopper is provided in front of the detector so that input of radiation energy to the detector can be intermittently changed, because an output signal corresponding to the radiation energy can not be obtained from the pyroelectric device unless an input signal to the detector is converted to an AC signal form. In such a structure, it is necessary to rectify an output signal of the detector in synchronism with the opening and closing of the chopper so that a detected output can be obtained in good condition. More specifically, although it is known that a phase of an output of a pyroelectric detector is delayed by approximately 90° with respect to input energy, such phase delay varies for each radiation thermometer since characteristics of components, such as the detector per se, an amplifying circuit for amplifying the output thereof or a chopper driving circuit, differ for each thermometer. Consequently, calibration work is required for each radiation thermometer to compensate for the phase delay. For this purpose, calibrating components are adjusted conventionally by observing an output signal of a rectifying circuit using an oscilloscope or the like at the time of manufacturing a radiation thermometer so as to generate a synchronous rectifying signal for operating the rectifying circuit without such phase delay as described above. However, such adjustment work is extremely troublesome and requires much skill.

In addition, such calibration work is also indispensable not only for compensation for phase delay as described above but also for calibration for eliminating error factors due to the difference for each optical system or each detector at the time of calculating temperature of a target object or for calibration for eliminating error factors due to a difference for each sensor of reference temperature at the time of detecting the reference temperature around the detector. Accordingly, in addition to adjustment of a plurality of variable resistors used as calibrating components, it is necessary in the prior art to effect complicated calibration work such as setting of calibration data to a DIP switch or fitting of a PROM containing calibration data into the main body of the thermometer during or after assembling of a radiation thermometer.

Furthermore, recalibration of a radiation thermometer is sometimes required as after-sales service and in such cases, it is necessary to effect again calibration work such as the above described adjustment of variable resistors, operation of a DIP switch by removing a cover, or replacement of PROM's, which is extremely troublesome.

In the conventional radiation thermometers, a large number of keys such as an emissivity setting key and various mode setting keys are provided on an operation panel, which makes the operation to be complicated. Therefore, improvement in operation efficiency is desired. Particularly as for the emissivity setting switch, by which emissivity can be changed also during measurement of temperature for convenience, it sometimes happens to the contrary that this switch is erroneously operated in vain, causing the set emissivity to be changed and making it difficult to obtain an accurate calculated value of temperature.

SUMMARY OF THE INVENTION

Therefore, a primary object of the present invention is to provide a radiation thermometer which has an improved operation efficiency and does not require complicated calibration work at the time of manufacturing thereof or after the sale thereof.

Briefly stated, the present invention is a radiation thermometer having a chopper in front of light receiving means to intermittently intercept input of radiation energy from the optical system to the light receiving means, an AC signal generated by the light receiving means being applied to temperature calculating means after having been rectified synchronously with predetermined timing related with timing of the chopping. A difference in time between the timing of chopping and the timing of inversion of the above stated AC signal generated from the light receiving means is detected and stored as calibration data so that the calibration data is used to correct the above stated synchronous rectifying timing at the time of measurement of temperature.

According to another aspect of the present invention, a radiation thermometer comprises calibration data calculating means for calculating temperature of a target object. The calibration data calculating means measures error factors existing at least in the optical system and the light receiving means and it prepares and stores calibration data so that temperature of a target object can be calculated by the calibration data at the time of measurement of the temperature in a state in which the above stated error factors are eliminated.

According to a further aspect of the present invention, a radiation thermometer comprises reference temperature detecting means for detecting temperature around light receiving means, and calibration data calculating means for correcting the reference temperature. The calibration data calculating means measures an error factor existing in the reference temperature detecting means and it prepares and stores calibration data so that the reference temperature detection can be effected by the calibration data at the time of measurement of the temperature in a state in which the above stated error factor is eliminated.

According to a still further aspect of the present invention, a radiation thermometer comprises emissivity change means for changing the setting of emissivity, and mode selection means for selecting a measurement mode or other modes. The emissivity change means performs a function of changing emissivity in the measurement mode and is used to change other data in the other modes.

According to a still further aspect of the present invention, a radiation thermometer comprises emissivity change means; however, change of emissivity is forbidden in a measurement mode.

According to a still further aspect of the present invention, a radiation thermometer comprises emissivity change means and temperature data holding means for holding calculated temperature data. Change of emissivity by the emissivity change means is permitted after the temperature data is held by the temperature data holding means.

According to a still further aspect of the present invention, a radiation thermometer has not only a measurement mode but also a calibration mode. In the calibration mode, calibrating operation in relation to calculation of temperature of a target object is performed so that calibration data is prepared and stored. The temperature is calculated in the measurement mode based on the calibration data.

According to a still further aspect of the present invention, a radiation thermometer comprises sequence control means formed by a microcomputer. The microcomputer includes a first sequence program for a calibration mode and a second sequence program for a measurement mode.

Consequently, a principal advantage of the present invention is that since the calibration mode or the calibration mode program is provided in the radiation thermometer itself, complicated calibration work is not required for calculation of temperature, making it possible to reduce a manufacturing cost.

Another advantage of the present invention is that since the emissivity change means is adapted to be used to change other functions in a mode different from the measurement mode, the number of switches of the thermometer can be decreased and operation efficiency can be improved.

A further advantage of the present invention is that since change of emissivity is forbidden in the measurement mode, an accurate calculated value of temperature can be obtained even if the emissivity change means is erroneously operated during measurement of temperature.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
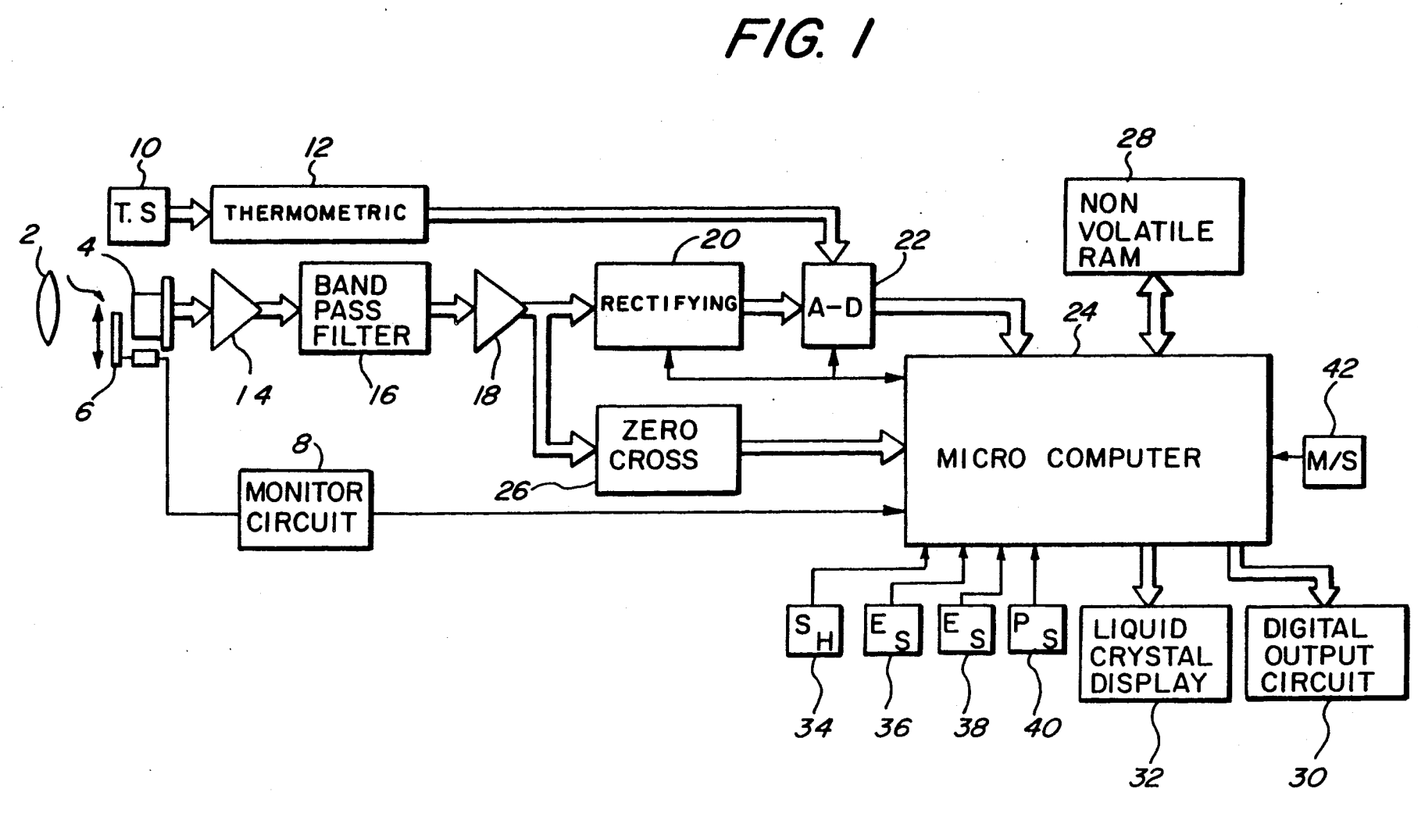
FIG. 1 is a schematic block diagram showing a construction of a radiation thermometer of an embodiment of the present invention.

FIG. 1 is a schematic block diagram showing a construction of a radiation thermometer of an embodiment of the present invention.

First referring to FIG. 1, a construction of the radiation thermometer of this embodiment will be described. In FIG. 1, radiation emitted from a target object (not shown) is converged through a converging lens 2 so as to be applied to a light receiving surface of a detector 4. A chopper 6 is provided in an optical path extending from the converging lens 2 to the detector 4 so as to intermittently intercept the beam to be applied to the detector 4. More specifically, the chopper 6 can be freely interposed in and removed from the above described optical path so as to repeat with a predetermined cycle a state in which it is located in the optical path to intercept the beam to be applied to the detector 4 (referred to hereinafter as a closed state) and a state in which it is removed from the optical path to permit the beam to be applied to the detector 4 (referred to hereinafter as an opened state). A surface of the chopper 6 facing the detector 4 serves as a reflection surface and, thus, when the chopper 6 is in the closed state, light from around the detector 4 reflected by the chopper 6 is applied to the detector 4. The opening and closing movement of the chopper 6 is monitored by a monitoring circuit 8 comprising a photoreflector. A chopper synchronizing signal generated according to the opened or closed state of the chopper 6 is applied to a microcomputer 24 to be described afterwards.

A temperature sensor 10 for measuring a reference temperature around the detector 4 is provided in the vicinity of the detector 4. An output of the temperature sensor 10 is inputted to an A-D converting circuit 22 through a thermometric circuit 12 so that it is converted to a digital signal, which is inputted to the microcomputer 24.

On the other hand, an output signal of the detector 4 is amplified by a preamplifier 14 and the amplified signal is applied to a bandpass filter 16 through which only a signal having the same frequency as the opening and closing frequency of the chopper 6 is permitted to pass. Thus, only the signal having the same frequency as the opening and closing frequency of the chopper 6 is selected through the filter 16 and only the thus selected signal is inputted to a main amplifier 18 so as to be further amplified.

An output signal of the main amplifier 18 is rectified by a rectifying circuit 20 and the rectified output signal is inputted to the A-D converting circuit 22. In this case, the rectifying circuit 20 synchronously rectifies the input signal by a synchronizing signal generated by the microcomputer 24 based on the above described chopper synchronizing signal. The A-D converting circuit 22 receives an analog signal concerning a temperature around the detector 4, outputted from the thermometric circuit 12 and an analog signal corresponding to the output signal of the detector 4, outputted from the rectifying circuit 20. The A-D converting circuit 22 converts the received analog signals to digital signals successively and outputs the digital signals to the microcomputer 24.

The microcomputer 24 calculates the temperature of the target object according to the input signal received through the A-D converting circuit 22 and performs self-calibration of the thermometer based on a calibration program stored in advance. The output signal of the main amplifier 18 is inputted to a zero-cross detecting comparator 26. The zero-cross detecting comparator 26 outputs a signal of high level when the sign of the input signal is plus, and outputs a signal of low level when it is minus. The output signal of the zero-cross detecting comparator 26 is hereinafter referred to as a zero-cross synchronizing signal.

Calibration data obtained when the microcomputer 24 executes a calibration program to be described afterwards is stored in a non-volatile RAM 28. The stored calibration data is outputted to the microcomputer 24 so as to be used for calibration of the thermometer at the time of temperature measurement. A digital output circuit 30 outputs, as a digital signal, data concerning the temperature of the target object calculated by the microcomputer 24. A liquid crystal display device 32 displays the calculated temperature of the target object. Functions of manually operable switches 34, 36, 38 and 40 will be described in the following referring to FIG. 2.

Figure 2:
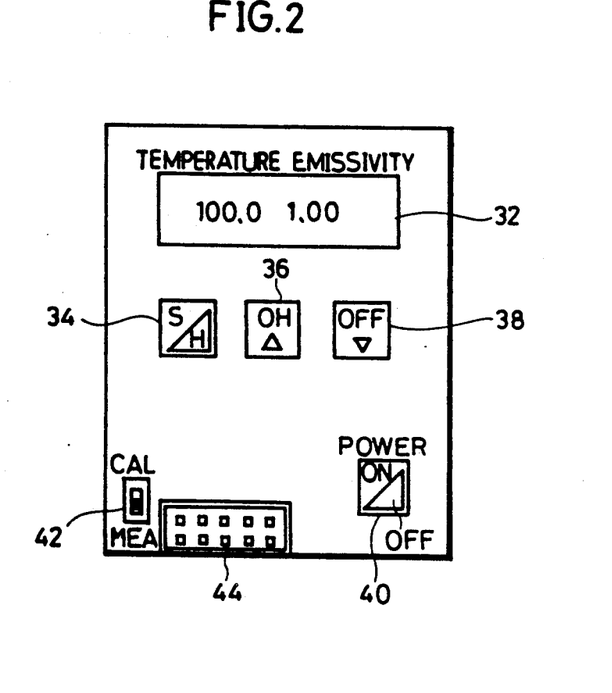
FIG. 2 is a front view showing a display portion and an operation portion of the radiation thermometer shown in FIG. 1.

FIG. 2 is a front view showing an operation portion and a display portion of the radiation thermometer shown in FIG. 1. In FIG. 2, the liquid crystal display device 32 displays a measured temperature and a set emissivity value as described previously. A sample-and-hold switch 34 is a switch for holding measured data when it is turned on and displaying the same on the liquid crystal display device 32. Switches 36 and 38 are emissivity setting switches. When the emissivity setting switch 36 is pressed, the emissivity value displayed on the liquid crystal display device 32 is increased. On the other hand, when the emissivity setting switch 38 is pressed, the emissivity value displayed on the liquid crystal display device 32 is decreased.

A power supply switch 40 serves to supply electric power to the whole of the thermometer. A switch 42 is a mode selection switch. When the mode selection switch 42 is set to an index "CAL", the thermometer is a calibration mode for self-calibration operation. When the mode selection switch 42 is set to an index "MEA", the thermometer is a measurement mode for measuring a temperature of a target object. An external terminal 44 for digital output corresponds to the digital output circuit 30 shown in FIG. 1.

Now, operation of the embodiment shown in FIGS. 1 and 2 will be described. First, in order to measure a temperature of a target object, the mode selection switch 42 is set to the index "MEA" and then the power supply switch 40 is turned on. As a result, measurement of the temperature is repeated and the measured temperature and a set emissivity value are displayed on the liquid crystal display device 32. When the sample-and-hold switch 34 is turned on in this state, the temperature measured at that moment is held and displayed on the liquid crystal display device 32. Then, by operating the switches 36 and 38, the set emissivity value can be changed. According to this change, the temperature thus held is newly calculated based on the new emissivity value and the newly calculated temperature is displayed.

In addition, the radiation thermometer of this embodiment has various calibration modes. In the following, operations in the respective calibration modes will be described in detail.

First of all, when the power supply switch 40 is turned on with the mode selection switch 42 being set to the index "CAL", operation in a calibration mode I starts.

This calibration mode I will be first described. In the radiation thermometer shown in FIG. 1, the detector 4 receives radiation energy emitted from a target object when the chopper 6 is in the opened state, while the detector 4 receives radiation energy from around the detector 4 reflected by the reflection surface of the chopper 6 when the chopper 6 is in the closed state. Those two states are repeated alternately with a predetermined cycle. Thus, an output of the detector 4 becomes an AC signal, which corresponds to a difference between the radiation energy from the target object and that emitted from around the detector 4. Consequently, in order to obtain the temperature of the target object, it is necessary to detect a reference temperature around the detector 4.

In the radiation thermometer of the embodiment shown in FIG. 1, this reference temperature is measured by the temperature sensor 10, which comprises a temperature sensing resistor having a resistance value changing according to the temperature. Since characteristics of the temperature sensing resistor and other components associated therewith have differences for each thermometer at the time of manufacturing thereof, it is necessary to perform calibration for each manufacturing thermometers so that such differences may not influence a measurement precision. The calibration mode I is provided to perform this calibration.

It is assumed in this embodiment that a resistance value at 0° C. of the temperature sensing resistor used in the temperature sensor 10 is $R_0$ and that digital values converted, by the A-D converting circuit 22, from resistance values of two fixed resistors $R_{10}$ and $R_{40}$ used for this calibration are $R_1$ and $R_2$, respectively. It is further assumed that a digital value obtained by A-D conversion from the resistance value of the temperature sensing resistor is Ra. Then, a relation between this value Ra and a temperature T is defined as follows:

$$T = a \cdot Ra + b \tag{1}$$

where a and b are constants, which differ for each thermometer. Assuming that a temperature coefficient ($\Omega$/°C). of the temperature sensing resistor is $\alpha$ and that resistance values of the temperature sensing resistor at $T_{10}$° C. and $T_{40}$° C. are $R_{10}$ and $R_{40}$, respectively, the following relations are established.

$$R_{10} = R_0 + a T_{10} \quad (2)$$

$$R_{40} = R_0 + a T_{40} \quad (3)$$

From the equation (11), $T_{10}$ and $T_{40}$ are expressed as follows.

$$T_{10} = a R_{10} + b \quad (4)$$

$$T_{40} = a R_{40} + b \quad (5)$$

If $T_{10}$ and $T_{40}$ are eliminated from the equations (2) to (5), temperature constants a and b inherent in each temperature sensing resistor can be obtained. Thus, the temperature constants a and b are obtained in the operation of the calibration mode I.

Figure 3:
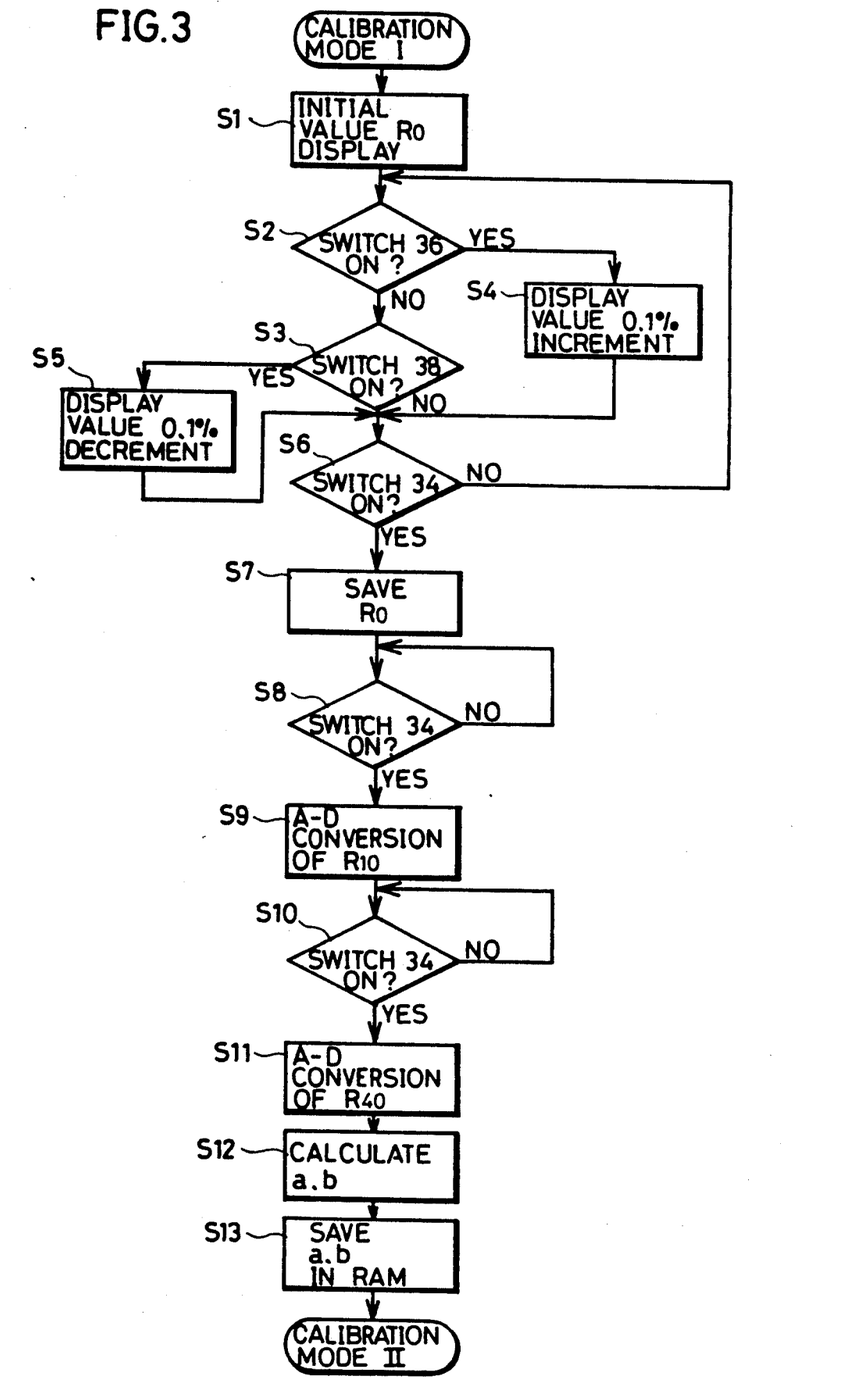
FIG. 3 is a flow chart showing operation in a calibration mode I of a microcomputer of the radiation thermometer shown in FIG. 1.

In the following, operation of the microcomputer 24 in this calibration mode I will be described referring to the flow chart in FIG. 3. Referring to FIG. 3, when the calibration mode I is started as described above, first of all in the step S1, a resistance value at 0° C. of the temperature sensor 10 is displayed as an initial value on the liquid crystal display device 32. Then, in the steps S2 and S3, it is determined whether the switch 36 or 38 is turned on or not. If the switch 36 is turned on, the program proceeds to the step S4, where the displayed value of the liquid crystal display device 32 is incremented by 0.1%. If the switch 38 is turned on, the program proceeds to the step S5, where the displayed value is decremented by 0.1%. Then, in the step S6, it is determined whether the sample-and-hold switch 34 is turned on or not. If the switch 34 is turned on, the displayed value on the liquid crystal display device 32 is saved as $R_0$ in the step S7. The displayed value can be freely changed by the switches 36 and 38 until the sample-and-hold switch 34 is turned on.

Subsequently, the operator connects the above stated fixed resistor $R_{10}$ instead of the temperature sensing resistor of the temperature sensor 10. On the other hand, the microcomputer 24 waits in the step S8 until the sample-and-hold switch 34 is turned on. More specifically, the operator connects the fixed resistor $R_{10}$ instead of the temperature sensing resistor before he presses the sample-and-hold switch 34, and when the connection is completed, the operator presses the sample-and-hold switch 34. Then, the program proceeds to the step S9 so that the digital value $R_1$ obtained from the value of the fixed resistor $R_{10}$ by A-D conversion in the A-D converting circuit 22 is inputted to the microcomputer 24.

Similarly, the operator connects this time the fixed resistor $R_{40}$ instead of the temperature sensing resistor and when this connection is completed, he presses the switch 34. Then, the program proceeds to the step S11 from the step S10 by the pressing of the switch 34, so that the digital value $R_2$ converted from the value of the fixed resistor $R_{40}$ by A-D conversion in the A-D converting circuit 22 is obtained by the microcomputer 24.

Then, the program of the microcomputer 24 proceeds to the step S12, where calibration constants a and b for calculating the temperature of the temperature sensing resistor used in the temperature sensor 10 are obtained based on the digital values $R_1$ and $R_2$ at the time of connection of the two fixed resistors $R_{10}$ and $R_{40}$, and temperature data $R_0$ set in the step S7. Then, in the step S13, the temperature constants a and b are saved in the non-volatile RAM 28. Thus, the constants a and b proper to the temperature sensing resistor involving difference for each thermometer are stored in the non-volatile RAM 28. Then, the program proceeds to the calibration mode II.

Figure 4:
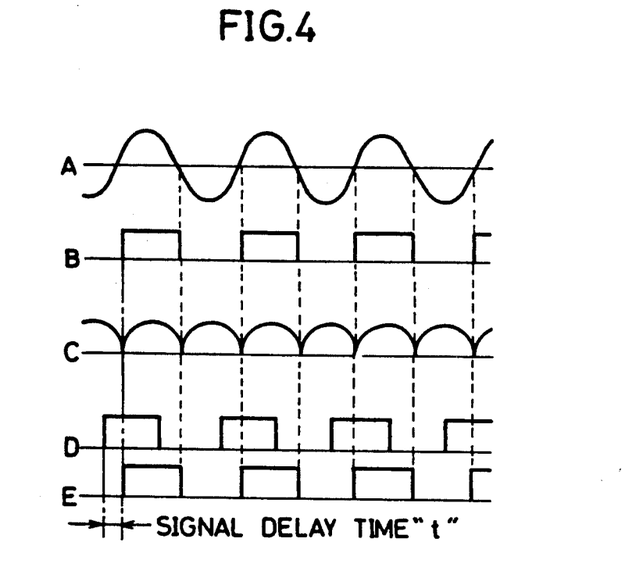
FIG. 4 is a timing chart showing changes in output signals of the respective circuits in the radiation thermometer shown in FIG. 1.

The calibration mode II will be described in the following. In the embodiment shown in FIG. 1, an energy signal from the detector 4 is rectified by the rectifying circuit 20 in response to the synchronous rectifying signal from the microcomputer 24. The synchronous rectifying signal is formed by causing the chopper synchronizing signal from the monitoring circuit 8 to be delayed in the microcomputer 24. Then, since the delayed time between the chopper synchronizing signal and the synchronous rectifying signal differs for each thermometer as described above, it is necessary to make calibration for compensation for such difference. FIG. 4 is a timing chart showing changes in the output signals of the respective circuits in the radiation thermometer shown in FIG. 1. It is assumed in FIG. 4 that: the energy signal from the detector 4 is A; the synchronous rectifying signal from the microcomputer 24 is B; the output signal of the rectifying circuit 20 is C; the chopper synchronizing signal from the monitoring circuit 8 is D; and the zero-cross synchronizing signal from the zero-cross detection comparator 26 is E. In FIG. 4, signal delay time t is given between the chopper synchronizing signal D and the synchronous rectifying signal B, this time t having a difference for each thermometer. Therefore, this difference for each thermometer is adjusted in the operation of the calibration mode II. In the embodiment shown in FIG. 1, the output signal of the main amplifier 18 inputted to the rectifying circuit 20 is also inputted to the zero-cross detection comparator 26. The zero-cross detection comparator 26 inverts the output each time the output signal of the main amplifier 18 crosses the zero point. Accordingly, the synchronous rectifying signal B from the microcomputer 24 and the zero-cross synchronizing signal E are always coincident with each other.

Figure 5:
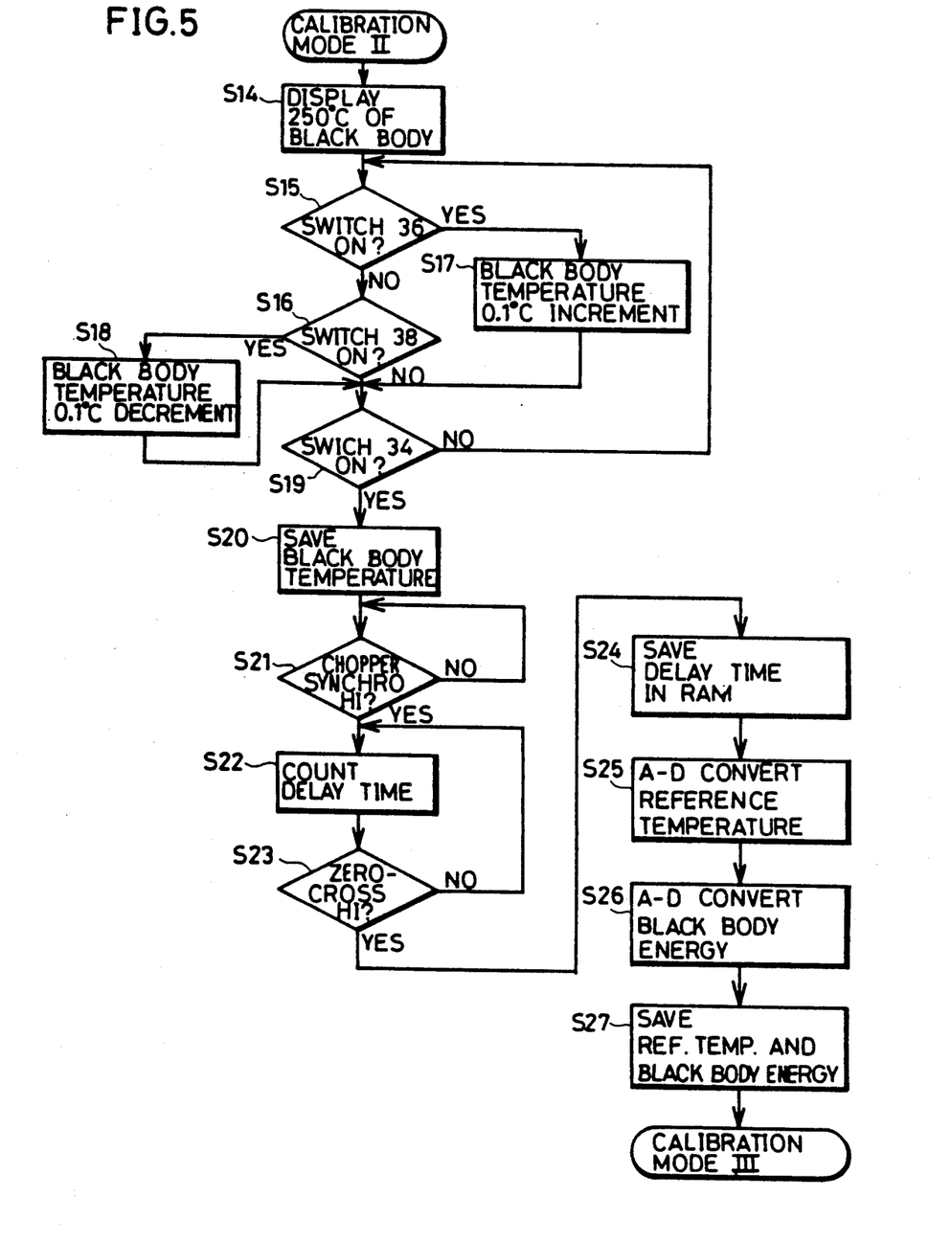
FIG. 5 is a flow chart showing operation in a calibration mode II of the microcomputer of the radiation thermometer shown in FIG. 1.

FIG. 5 is a flow chart showing operation of the microcomputer 24 in the calibration mode II. Data necessary for calibration in this calibration mode II are data on a temperature of a blackbody furnace in a high-temperature region (around 250° C. in this embodiment) of measurement range, a digitally converted value of the output of the detector 4 receiving energy emitted from the blackbody furnace, and a reference temperature used at that time.

In the step S14, 250° C. is displayed on the liquid crystal display device 32 as an initialized value of the temperature of the blackbody furnace. Subsequently in the steps S15 and S16, it is determined whether the switch 36 or 38 is operated or not. If the switch 36 is operated, the program proceeds to the step S17 so that the displayed temperature of the blackbody furnace is incremented by 0.1° C. On the other hand, if the switch 38 is operated, the program proceeds to the step S18 so that the displayed temperature of the blackbody furnace is decremented by 0.1° C. In other words, the operator sets the predetermined temperature of the blackbody furnace displayed on the liquid crystal display device 32 by operating the switch 36 or 38. Then, when the setting is completed, the operator presses the sample-and-hold switch 34. The displayed value can be changed by operating the switch 36 or 38 until the sample-and-hold switch 34 is pressed. Thus, when the predetermined temperature of the blackbody furnace is set on the liquid crystal display device 32 and the sample-and-hold switch 34 is pressed, the program proceeds to the step S20 from the step S19, where the temperature of the blackbody furnace displayed on the liquid crystal display device 32 is saved in the non-volatile RAM 28.

Then, in the step S21, it is determined whether the chopper synchronizing signal (shown as D in FIG. 4) from the monitoring circuit 8 is at the high level or not. If the chopper synchronizing signal attains the high level, the program proceeds to the step S22 so that counting is started to determine the signal delay time t. This counting is brought to an end when it is determined in the step S23 that the zero-cross synchronizing signal (shown as E in FIG. 4) of the zero-cross detection comparator 26 attains the high level. As a result, the signal delay time t corresponding to a period from the time when the chopper synchronizing signal D attains the high level to the time when the zero-cross synchronizing signal E attains the high level is measured. Then, in the step S24, the thus measured signal delay time t is saved in the non-volatile RAM 28.

Subsequently in the step S25, the output signal of the temperature sensor 10 is converted to a digital signal by the A-D converting circuit 22 and the temperature of the detector 4 is calculated by using the temperature constants a and b obtained in the calibration mode I. Further in the step S26, the output signal of the rectifying circuit 20 corresponding to the output of the detector 4 at the time of measurement of the blackbody furnace is converted to a digital signal by the A-D converting circuit 22 and, in the step S27, the temperature of the detector 4 and the digital value obtained by the A-D conversion concerning the radiation energy of the blackbody furnace are saved in the non-volatile RAM 28. Then, the program proceeds to the calibration mode III.

This calibration mode III is used to obtain a calibration constant for calculating a temperature of a target object based on a digital value of radiation energy of the target object obtained by A-D conversion and a reference temperature.

Assuming that the temperature of the target object is Tt, that the emissivity thereof is $\epsilon T$, that the spectral radiation energy of the target object is Et, that the reference temperature is Td, that the spectral radiation energy of the reference temperature is $E(Td, \lambda)$ and that spectral sensitivity of the detector 4 is $S(\lambda)$, energy $E_0$ incident on the detector 4 in the opened state of the chopper 6 is as follows.

$$E_0 = \int_0^\infty \{A \cdot \epsilon t \cdot E(Tt, \lambda) + B \cdot E(Td, \lambda)\} \cdot S(\lambda) \cdot d\lambda \quad (6)$$

On the other hand, energy Ec incident on the detector 4 in the closed state of the chopper 6 is as follows.

$$Ec = \int_0^\infty C \cdot E(Td, \lambda) \cdot S(\lambda) \cdot d\lambda \quad (7)$$

In those equations, A, B and C represent constants.

Accordingly, a difference $\Delta E$ in the incident energy in those two states is expressed by the following equation:

$$\Delta E = E_0 - Ec \quad (8)$$
$$= A \cdot \epsilon t \int_0^\infty E(Tt, \lambda) \cdot S(\lambda) \cdot d\lambda -$$
$$D \int_0^\infty E(Td, \lambda) \cdot S(\lambda) \cdot d\lambda$$

where $D = B - C$. From the equation (8), the radiation energy Et of the target object is expressed as follows:

$$Et = \epsilon t \int_0^\infty E(Tt, \lambda) \cdot S(\lambda) \cdot d\lambda \quad (9)$$
$$= c \cdot \Delta E + d \int_0^\infty E(Td, \lambda) \cdot S(\lambda) \cdot d\lambda$$

where c and d are constants, $c = 1/A$ and $d = D/A$. If the equation (9) is expressed as follows, $$Et = \epsilon t \cdot f(Tt) \quad (10)$$

the temperature Tt of the target object is expressed by the following equation (11).

$$Td = f^{-1}(Et/t) \quad (11)$$

In this embodiment, the constants c and d are obtained in the calibration mode III. More specifically, a temperature of the blackbody furnace, a reference temperature and a digital value of radiation energy in a low-temperature range (around 30° C.) are measured in the calibration mode III independently of the values of those data in a high-temperature range (around 250° C.) measured previously in the calibration mode II. In the following, the operation of the microcomputer 24 in the calibration mode III will be described with reference to the flow chart in FIG. 6.

Figure 6:
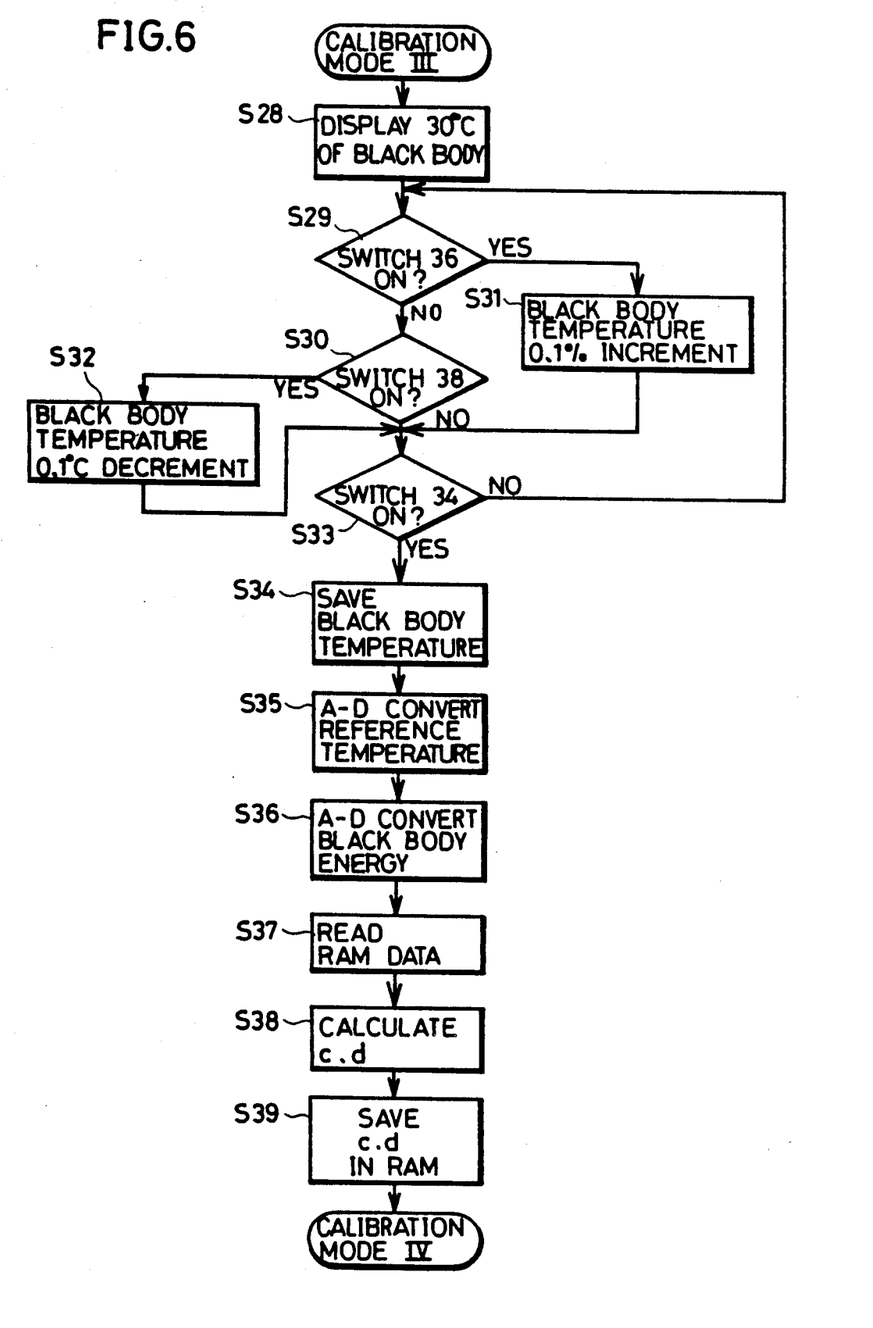
FIG. 6 is a flow chart showing operation in a calibration mode III of the microcomputer of the radiation thermometer shown in FIG. 1.

In the steps S28 to S34, the temperature of the blackbody furnace is saved in the non-volatile RAM 28 in the same manner as in the steps S14 to S20, except that the temperature of the blackbody furnace is initialized to 30.0 in the step S28.

In the step S35, an output signal of the temperature sensor 10 is converted to a digital value by the A-D converting circuit 22 and a reference temperature of the detector 4 is calculated by using the constants a and b obtained in the calibration mode I. Then, in the step S36, an output signal of the detector 4 receiving radiation energy from the blackbody furnace is converted to a digital value by the A-D converting circuit 22. Subsequently in the step S37, the emissivity and the temperature of the blackbody furnace, the reference temperature and the digital value of the output signal of the detector 4 receiving the radiation energy from the blackbody furnace, which are obtained in the calibration mode II and saved in the non-volatile RAM 28, are read out from the non-volatile RAM 28 and loaded in the microcomputer 24. Then, in the step S38, calibration constants c and d necessary for converting the output signal of the detector 4 to a temperature corresponding thereto are calculated based on the data inputted in those steps S27, S34 and S35 to S37. The calculated temperature calibration constants c and d are saved in the non-volatile RAM 28 in the step S39 and thus the operation in the calibration mode III is completed.

The radiation thermometer of the present embodiment has further two calibration modes in addition to the above described three calibration modes. A calibration mode IV is adapted to select a Celsius scale (°C.) or a Fahrenheit scale (°F.) to display the temperature on the liquid crystal display device 32. A calibration mode V is adapted to finely adjust a gain of the main amplifier 18 shown in FIG. 1.

Figure 7:
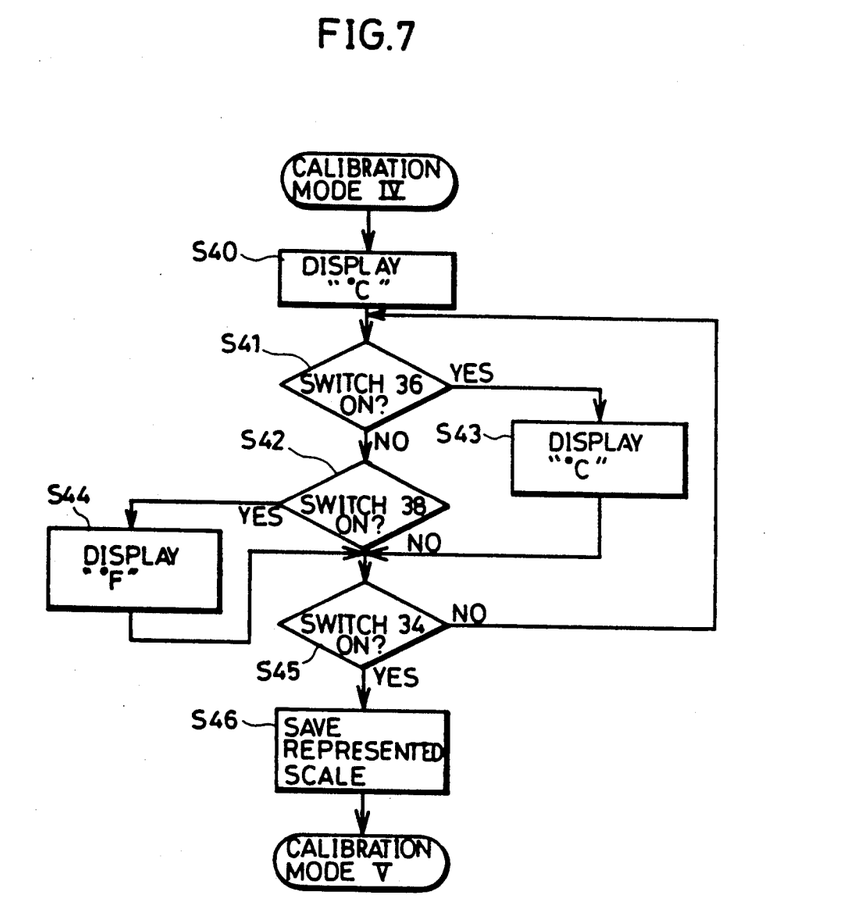
FIG. 7 is a flow chart showing operation in a calibration mode IV of the microcomputer of the radiation thermometer shown in FIG. 1.

First, operation in the calibration mode IV will be described referring to the flow chart in FIG. 7. When the program of the calibration mode IV is started, a unit of temperature "° C." representing the Celsius scale is initially shown on the liquid crystal display device 32 in the step S40. Then, it is determined in the steps S41 and S42 whether the switches 36 and 38 are turned on or not, respectively. If the switch 36 is turned on, the program proceeds to the step S43 so that the unit of temperature "° C." is shown as it is on the liquid crystal display device 32. If the switch 38 is turned on, the program proceeds to the step S44 so that the unit of temperature "° F." representing the Fahrenheit scale is shown. The selection of those scales can be made until the sample-and-hold switch 34 is turned on. When it is determined in the step S45 that the sample-and-hold switch 34 is turned on, the program proceeds to the step S46, where the scale of temperature represented at that time is saved in the non-volatile RAM 28. Then, the program proceeds to the calibration mode V.

Figure 8:
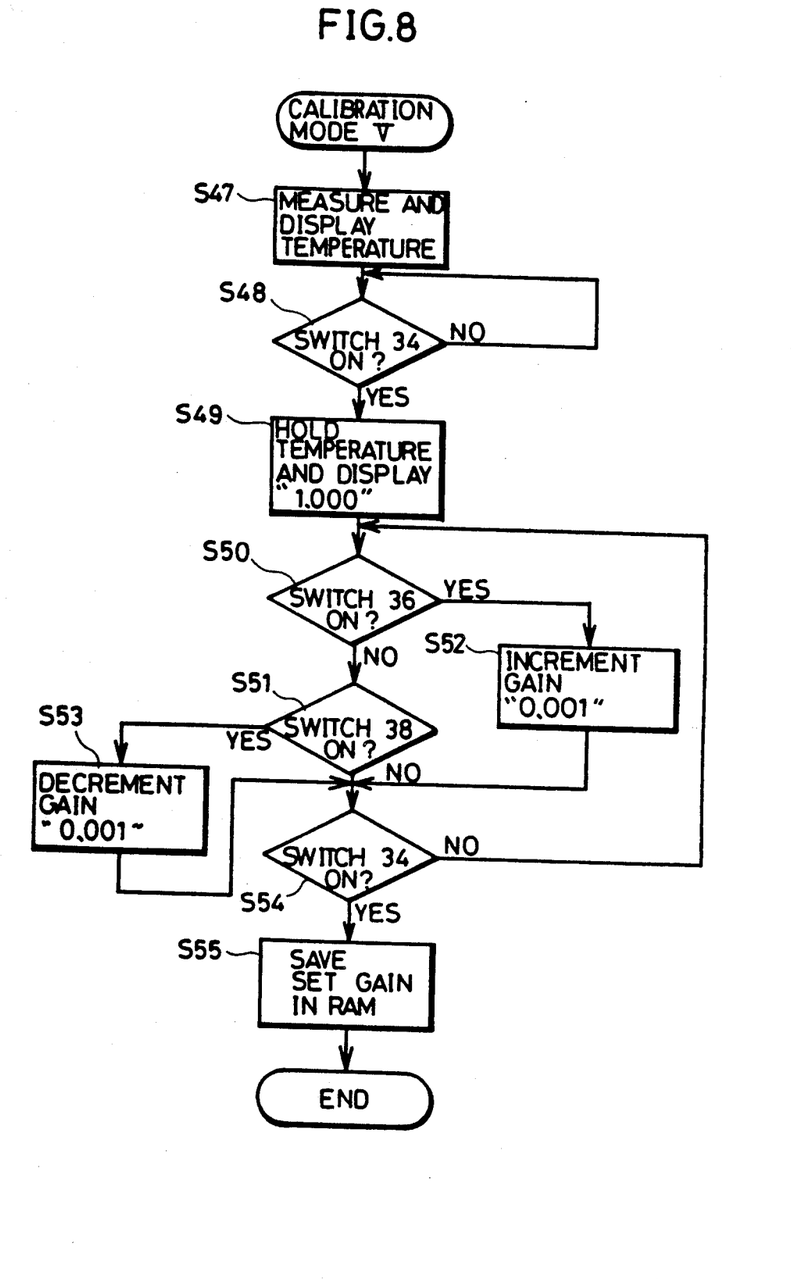
FIG. 8 is a flow chart showing operation in a calibration mode V of the microcomputer of the radiation thermometer shown in FIG. 1.

Referring to the flow chart in FIG. 8, operation of the microcomputer 24 in the calibration mode V will be described. First in the step S47, a temperature of a target object is measured and displayed on the liquid crystal display device 32 and the program waits until the sample-and-hold switch 34 is turned on in the step S48. When it is determined in the step S48 that the sample-and-hold switch 34 is turned on, the program proceeds to the step S49, in which the temperature displayed on the liquid crystal display device 32 is held and "1.000" is displayed as a gain of the main amplifier 18 on the liquid crystal display device 32. This gain can be changed by operation of the switches 36 and 38. When it is determined in the step S50 that the switch 36 is turned on, the program proceeds to the step S52 so that the gain is incremented by "0.001". On the other hand, when it is determined in the step S51 that the switch 38 is turned on, the program proceeds to the step S53 so that the gain is decremented by "0.001". The gain of the main amplifier 18 can be thus set until the sample-and-hold switch 34 is turned on. When it is determined in the step S54 that the sample-and-hold switch 34 is turned on, the program proceeds to the step S55 so that the set gain displayed on the liquid crystal display device 32 is saved in the non-volatile RAM 28.

Figure 9:
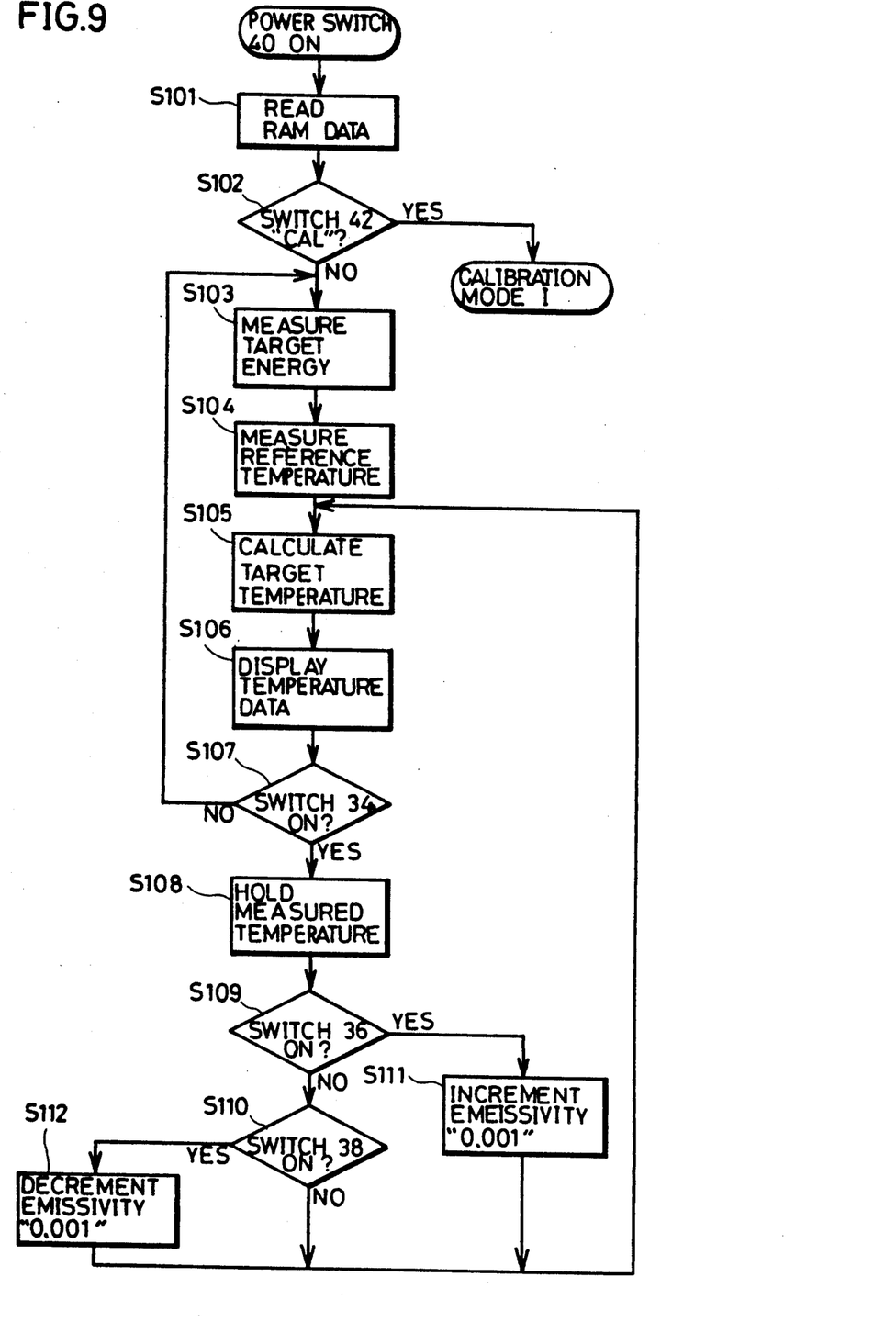
FIG. 9 is a flow chart showing operation in a measurement mode of the microcomputer of the radiation thermometer shown in FIG. 1.

FIG. 9 is a flow chart of the microcomputer 24 concerning the whole operation of the radiation thermometer of the embodiment of the present invention. Referring to FIG. 9, when the power supply switch 40 is turned on, the microcomputer 24 reads out in the step S101 the above described various data necessary for measurement of temperature from the non-volatile RAM 28. Then, in the step S102, the microcomputer 24 detects a state of the mode selection switch 42 to determine whether a measurement mode or a calibration mode is selected If the calibration mode "CAL" is selected, the microcomputer 24 executes the sequential calibration operation starting from the above described calibration mode I. On the other hand, if the measurement mode "MEA" is selected, the microcomputer 24 measures the energy from the target object in the step S103, measures the reference temperature of the detector 4 in the step S104 and calculates the temperature of the target object based on the known Wien law in the step S105. Further in the step S106, data on the calculated temperature is applied to the liquid crystal display device 32, where it is displayed in digital form. Then, in the step S107, it is determined whether the sample-and-hold switch 34 is turned on or not. If it is not turned on, the program returns to the step S103 to repeat measurement. On the other hand, if the switch 34 is turned on, the measured temperature is held in the step S108. Then, in this state, it is determined in the steps S109 and S110 whether the emissivity setting switches 36 and 38 are turned on or not, respectively. If the switch 36 is turned on, the emissivity is incremented by "0.001" in the step S111. If the switch 38 is turned on, the emissivity is decremented by "0.001" in the step S112. If neither of those switches is turned on, the program proceeds to the step S105 without changing the emissivity. In the embodiment shown in FIG. 9, change of emissivity during measurement of the temperature is forbidden so that the emissivity may not be changed even if the emissivity setting switch 36 or 38 is pressed erroneously during the measurement. Thus, an accurate measured value of the temperature can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A radiation thermometer comprising:
   optical means for converging radiation energy emitted from an object,
   light receiving means for receiving the radiation energy converged by said optical means and converging said radiation energy to an electrical signal,
   chopper means provided in front of said light receiving means for intermittently intercepting the radiation energy to be applied to said light receiving means,
   rectifier means for rectifying the electrical signal generated from said light receiving means due to the intermittent interception of the radiation energy by said chopper means,
   temperature calculator means for calculating a temperature of said object based on an output signal from said rectifier means,
   temperature display means for displaying a temperature calculated by said temperature calculator means,
   chopping detection means for detecting the intermittent interception of the radiation energy by said chopper means and outputting a synchronizing signal changing in correspondence with a cycle of said intermittent interception,
   synchronous rectification means for determining timing of rectification of said electrical signal by said rectifier means based on said synchronizing signal outputted from said chopping detection means,
   calibration data calculator means for calculating calibration data on the basis of the electrical signal generated from said light receiving means and the synchronizing signal outputted from said chopper detection means to correct the timing of synchro- nous rectification of said synchronous rectification means, said calibration calculator means comprising:

zero-cross detection means for detecting timing for inversion of the electrical signal generated from said light receiving means due to the intermittent interception of the radiation energy by said chopper means, and outputting a zero-cross signal changing in correspondence with said inversion, time difference detection means for detecting a time difference between the synchronizing signal outputted from said chopper detection means and the zero-cross signal outputted from said zero-cross detection means, memory means for storing said time difference detected by said time difference detection means, and correction means for correcting said timing of synchronous rectification based on the time difference stored in said memory means.

2. A radiation thermometer in accordance with claim 1, further comprising selection means for selecting a measurement mode or a calibration mode, wherein said time difference detection means detects and stores in said memory means the time difference between said synchronizing signal and said zero-cross signal while said calibration mode is selected, and said correction means corrects said timing of synchronous rectification based on the time difference stored in said memory means and said temperature calculator means calculates the temperature of said object based on an output signal provided by the synchronous rectification while said measurement mode is selected.

3. A radiation thermometer comprising:

optical means for converging radiation energy emitted from an object, light receiving means for receiving the radiation energy converged by said optical means and converting the radiation energy to an electrical signal, temperature calculator means for calculating a temperature of said object based on the electrical signal from said light receiving means, and responsive to calibration data to eliminate error factors contributed by said optical means and said light receiving means, temperature display means for displaying the temperature calculated by said temperature calculator means, and calibration data calculator means for calculating said calibration data said calibration data being related to error factors contributed at least by said optical means and said light receiving means, memory means for storing the calibration data prepared by said calibration data calculator means, and means for transmitting the calibration data stored in said memory means to said temperature calculator means.

4. A radiation thermometer in accordance with claim 3, further comprising selection means for selecting a measurement mode or a calibration mode, wherein said calibration data calculator means prepares the calibration data and stores said calibration data in said memory means while said calibration mode is selected, and said means for transmitting transmits the calibration data stored in said memory means to said temperature calculator means and said temperature calculator means calculates the temperature of said object based on said calibration data while said measurement mode is selected.

5. A radiation thermometer in accordance with claim 4, further comprising reference temperature detector means for calculating a temperature around said light receiving means, wherein said temperature calculator means calculates the temperature of said object by referring to the temperature around said light receiving means detected by said reference temperature detector means.

6. A radiation thermometer in accordance with claim 4, wherein said error factors contributed at least by said optical means and said light receiving means signify irregular differences in characteristics from other radiation thermometers of the same type.

7. The radiation thermometer of claim 3 further including chopper means provided in front of said light receiving means for intermittently intercepting the radiation energy to be applied to said light receiving means.

8. A radiation thermometer comprising:

optical means for converging radiation energy emitted from an object, light receiving means for receiving the radiation energy converged by said optical means and converting the radiation energy to an electrical signal, reference temperature detector means for detecting a reference temperature around said light receiving means thereby to convert the detected temperature to a reference temperature signal, temperature calculator means for calculating a temperature of said object based on the electrical signal from said light receiving means and the reference temperature signal from said reference temperature detector means, temperature display means for displaying the temperature calculated by said temperature calculator means, and calibration data calculator means for calculating calibration data for correcting the reference temperature detected by said reference temperature detector means, said calibration data compensating for an error factor contributed by said reference temperature detector means, and memory means for storing the calibration data.

9. A radiation thermometer in accordance with claim 8, further comprising selection means for selecting a measurement mode or a calibration mode, wherein said calibration data calculator means prepares and stores in said memory means said calibration data while said calibration mode is selected.

10. A radiation thermometer in accordance with claim 9, wherein the error factor existing in said reference temperature detector means signifies an irregular difference from other radiation thermometers of the same type.

11. A radiation thermometer in accordance with claim 9, further comprising
emissivity change means for changing a set value of emissivity to output a signal corresponding to a newly set emissivity value, said temperature calculator means calculating the temperature based on the emissivity value set by said emissivity change means.

12. A radiation thermometer comprising:
optical means for converging radiation energy emitted from an object,
light receiving means for receiving the radiation energy converging by said optical means and converting the radiation energy to an electrical signal,
emissivity change means for changing a set value of emissivity to output a signal corresponding to a newly set value of emissivity,
temperature calculator means for calculating a temperature of said object based on said electrical signal from said light receiving means and the output signal from said emissivity change means,
temperature display means for displaying the temperature calculated by said temperature calculator means, and
mode selection means for selecting a measurement mode in which the temperature of said object is being measured or another mode, said emissivity change means changing the emissivity while said measurement mode is selected and changing specified data while said other mode is selected.

13. A radiation thermometer in accordance with claim 12, wherein
said other mode is a calibration mode for obtaining adjustment data necessary for the calculation of the temperature of said object thereby to store the same in memory means.

14. A radiation thermometer in accordance with claim 12, further comprising
emissivity change forbidding means for forbidding change of emissivity by said emissivity change means while the temperature of said object is being measured by selecting the measurement mode, and
emissivity display means for displaying the emissivity set by said emissivity change means.

15. A radiation thermometer in accordance with claim 12, wherein
said other means is a mode for changing a scale for the temperature displaying by said temperature display means, and said specified data is data for selecting a Celsius scale or a Fahrenheit scale.

16. The radiation thermometer of claim 12 further including chopper means provided in front of said light receiving means for intermittently intercepting the radiation energy to be applied to said light receiving means.

17. A radiation thermometer comprising:
optical means for converging radiation energy emitted from an object,
light receiving means for receiving the radiation energy converged by said optical means and converting the radiation energy to an electrical signal,
emissivity change means for changing a set value of emissivity to output a signal corresponding to a newly set value of emissivity,
temperature calculator means for calculating a temperature of said object based on said electrical signal from said light receiving means and the output signal from said emissivity change means,
temperature display means for displaying the temperature calculated by said-temperature calculating means, and
emissivity change forbidding means for forbidding change of emissivity by said emissivity change means when the temperature of said object is being measured.

18. A radiation thermometer in accordance with claim 17, wherein
said emissivity change means comprising:
an up-switch for increasing emissivity,
a down-switch for decreasing emissivity, and
control means for increasing or decreasing the emissivity in response to a signal generated by operation of said up-switch of said down-switch,
said emissivity change forbidding means comprising:
determination means for determining whether the temperature of said object is being measured or not, and
forbidding means for forbidding application, to said control means, of the signal generated by operation of said up-switch or said down-switch when said determination means determines that the temperature of said object is being measured.

19. A radiation thermometer comprising:
optical means for converging radiation energy emitted from an object,
light receiving means for receiving the radiation energy converged by said optical means and converting the radiation energy to an electrical signal,
emissivity change means for changing a set value of emissivity to output a signal corresponding to a newly set value of emissivity,
temperature calculator means for calculating a temperature of said object based on said electrical signal from said light receiving means and the output signal from said emissivity change means to produce temperature data,
data holding means for holding temperature data obtained by said temperature calculating means and for forbidding a change of temperature data based on an electrical signal newly converted by said light receiving means
temperature change means for changing the temperature data held by said data holding means in response to change of emissivity permitted by said emissivity change means, and
temperature display means for displaying the temperature based on the temperature data held by said data holding means.

20. A radiation thermometer in accordance with claim 19, wherein
said emissivity change forbidding means forbids change of emissivity when the temperature of said object is being measured.

21. The radiation thermometer of claim 19 further including chopper means provided in front of said light receiving means for intermittently intercepting the radiation energy to be applied to said light receiving means.

22. A radiation thermometer comprising:
optical means for converging radiation energy emitted from an object,
light receiving means for receiving the radiation energy converging by said optical means and converting the radiation energy to an electrical signal,
temperature calculator means for calculating a temperature of said object based on said electrical signal from said light receiving means, temperature display means for displaying the temperature calculated by said temperature calculator means, an operating member, mode selection means for selecting a measurement mode or a calibration mode in response to operation of said operating member, said calibration mode being a mode for performing a calibration operation with respect to the calculation of the temperature of said object to store calibration data obtained as a result of said calibration operation, and said measurement mode being a mode for calculating the temperature of said object based on the calibration data obtained in said calibration mode.

23. The radiation thermometer of claim 22 further including chopper means provided in front of said light receiving means for intermittently intercepting the radiation energy to be applied to said light receiving means.

24. A radiation thermometer comprising:

optical means for converging radiation energy emitted from an object, light receiving means for receiving the radiation energy converged by said optical means and converting the radiation energy to an electrical signal, temperature calculator means for calculating a temperature of said object based on the electrical signal, of said light receiving means, temperature display means for displaying the temperature calculated by said temperature calculator means, sequence control means including a microcomputer and a memory, said microcomputer having a first sequence program for preparing calibration data necessary for calculation of the temperature of said object and storing the prepared calibration data in said a memory, and a second sequence program for performing sequence control of said temperature calculator means for calculating the temperature of said object based on the calibration data stored in said a memory, an operating member, and mode selection means for selecting said first sequence program or said second sequence program in response to operation of said operating member.

25. A radiation thermometer in accordance with claim 19, further comprising emissivity change forbidding means for forbidding change of emissivity by said emissivity change means, and emissivity change permitting means for permitting change of emissivity by said emissivity change means when the temperature data is being held by said data holding means.

26. A radiation thermometer in accordance with claim 24, wherein said memory is a nonvolatile RAM.

27. The radiation thermometer of claim 24 further including chopper means provided in front of said light receiving means for intermittently intercepting the radiation energy to be applied to said light receiving means.

28. A radiation thermometer comprising:

optical means for converging radiation energy emitted from an object;

light receiving means for receiving the radiation energy converged by said optical means and converting the radiation energy to an electrical signal, a temperature sensing resistor means having a resistance value for detecting a reference temperature around said light receiving means thereby to convert the detected temperature to a reference temperature signal, temperature calculator means for calculating a temperature of said object based on the electrical signal from said light receiving means, the reference temperature signal from said temperature sensing resistor means and calibration data, temperature display means for displaying the temperature calculated by said temperature calculator means, calibration data calculator means for calculating calibration data for correcting for an error factor contributed by said reference temperature detector means, said calibration data comprising the constants a and b in the expression $T = a.Ra + b$ where T is a temperature and Ra represents a resistance value of the temperature sensing resistor means, memory means for storing said calibration data, and means for transmitting the calibration data stored in said memory means to said temperature calculator means.

29. A radiation thermometer in accordance with claim 28, further comprising:

selection means for selecting a measuring mode or a calibration mode, wherein said calibration data calculator means prepares and stores in said memory means said calibration data while said calibration mode is selected, and said means for transmitting transmits said calibration data stored in said memory means to said temperature calculator means and said temperature calculator means calculates said temperature based on said calibration data while said measurement mode is selected.

30. A radiation thermometer comprising:

optical means for converging radiation energy emitted from an object, light receiving means for receiving the radiation energy converged by said optical means and converting the radiation energy to an electrical signal, temperature calculator means for calculating a temperature of said object based on said electrical signal from said light receiving means and based on calibration data, calibration data calculator means for calculating said calibration data based on first and second black body temperatures, temperature display means for displaying the temperature calculated by said temperature calculator means, an operating member, mode selection means for selecting a measurement mode or a calibration mode in response to operation of said operating member, said calibration mode being a mode wherein said calibration data calculator means calculates and stores said calibration data, and said measurement mode being a mode for calculating the temperature of said object based on the calibration data obtained in said calibration mode.

31. A radiation thermometer comprising:

optical means for converging radiation energy emitted from an object, light receiving means for receiving the radiation energy converged by said optical means and converting the radiation energy to an electrical signal, temperature calculator means for calculating a temperature of said object based on the electrical signal of said light receiving means, temperature display means for displaying the temperature calculated by said temperature calculator means, sequence control means including a microcomputer and a memory, said microcomputer having
- a first sequence program for preparing calibration data necessary for calculation of the temperature of said object, said calibration data including data based on first and second black body temperatures, and storing the prepared calibration data in said memory, and
- a second sequence program for performing means for calculating the temperature of said object based on the calibration data stored in said memory, an operating member, and mode selection means for selecting said first sequence program or said second sequence program in response to operation of said operating member.

32. The radiation thermometer of claim 31 wherein said first sequence program determines detector reference temperatures corresponding to first and second black body temperatures.

33. The radiation thermometer of claim 32 further including temperature sensing resistance means for producing a reference signal and wherein said first sequence program determines constants a and b in the formula $T = a \cdot Ra + b$, where T represents temperature and R represents a resistance value of said temperature sensing resistor means.

34. A radiation thermometer comprising:

optical means for converging radiation energy emitted from an object, light receiving means for receiving the radiation energy converged by said optical means and converting the radiation energy to an electrical signal, emissivity change means for changing a set digital value of emissivity to output a signal corresponding to a newly set digital value of emissivity, calculator means for calculating calibration data and for calculating a temperature of said object based on said electrical signal from said light receiving means, the output signal from said emissivity change means and said calibration data, temperature display means for displaying the temperature calculated by said temperature calculator means, and mode selection means for selecting a first mode in which the temperature of said object is being measured or a second mode in which said calibration data is determined, said emissivity change means changing the emissivity while said first mode is selected and changing data used in determination of said calibration data while said second mode is selected.

35. The radiation thermometer of claim 34 wherein said emissivity change means comprises:

an up-switch for increasing emissivity by incremental numerical amounts, and a down-switch for decreasing emissivity by incremental numerical amounts.

* * * * *